US009474670B2

(12) United States Patent
Pamplona Rovira

(10) Patent No.: US 9,474,670 B2
(45) Date of Patent: Oct. 25, 2016

(54) CART FOR DISPENSING HEALTH PRODUCTS

(71) Applicant: KRZ, S.L., Barcelona (ES)

(72) Inventor: Jordi Pamplona Rovira, Barcelona (ES)

(73) Assignee: KRZ, S.L., Barcelona (ES)

( * ) Notice: Subject to any disclaimer, the term of this patent is extended or adjusted under 35 U.S.C. 154(b) by 0 days.

(21) Appl. No.: 14/574,874

(22) Filed: Dec. 18, 2014

(65) Prior Publication Data

US 2016/0175176 A1 Jun. 23, 2016

(51) Int. Cl.

| | |
|---|---|
| ***B62B 5/00*** | (2006.01) |
| ***A61G 12/00*** | (2006.01) |
| ***A61J 7/00*** | (2006.01) |
| ***A47B 31/00*** | (2006.01) |
| ***E05B 65/46*** | (2006.01) |

(52) U.S. Cl.

CPC ............. *A61G 12/001* (2013.01); *A47B 31/00* (2013.01); *A61J 7/0076* (2013.01); *E05B 65/462* (2013.01); *A47B 2031/003* (2013.01); *A47B 2031/006* (2013.01); *A61G 2203/20* (2013.01)

(58) Field of Classification Search

CPC .... A61G 12/001; B47B 31/00; B47B 47/05; B47B 67/04; B62B 5/00

See application file for complete search history.

(56) References Cited

U.S. PATENT DOCUMENTS 5,673,983 A * 10/1997 Carlson .................. A47B 67/04 312/218
6,746,091 B2 * 6/2004 Friar .................... A61G 12/001 312/218
8,146,753 B2 * 4/2012 Yuyama ............... A61G 12/001 211/59.3
2002/0070847 A1 * 6/2002 Hamilton ............. A61G 12/001 340/309.16
2003/0222548 A1 * 12/2003 Richardson ............ A47B 81/00 312/209
2004/0148055 A1 * 7/2004 Shoenfeld ............ A61G 12/001 700/237
2004/0262867 A1 * 12/2004 Arceta ................. A61G 12/001 280/47.35
2005/0199022 A1 * 9/2005 Friar ................... E05B 47/0012 70/78
2006/0220507 A1 * 10/2006 Steele .................... A47B 47/05 312/330.1
2010/0007250 A1 * 1/2010 Sharpe ................. A61G 12/001 312/209
2011/0317817 A1 * 12/2011 Nishino ............... A61B 6/4405 378/102
2012/0013464 A1 * 1/2012 Roberts .................. G08B 13/08 340/541
2013/0307237 A1 * 11/2013 Chen .................... A61G 12/001 280/35
2014/0197954 A1 * 7/2014 Caputo ............. G06K 7/10366 340/572.1
2015/0227127 A1 * 8/2015 Miller .................. G05B 19/042 700/244

* cited by examiner

*Primary Examiner* — Hau Phan
(74) *Attorney, Agent, or Firm* — Sturm & Fix LLP

(57) ABSTRACT

A cart (1) for dispensing health products, such as drugs and medicines, designed for health centers and similar, comprising a main chassis provided with directional wheels (3) underneath, where a plurality of drawers that protrude from at least a number of the sides of the main chassis are provided for, with locking mechanism in order to remain in a fixed position in the main chassis; a control unit linked to the drawers in order to open and/or close the same and a user interface, the plurality of drawers being supported on at least one removable support structure (5). Each one of the drawers (4) has a locking mechanism linked to electrically operable fastening found inside the main chassis, in communication with the control unit, the locking mechanism of each one of the drawers including a number of position detection mechanism.

11 Claims, 7 Drawing Sheets

CART FOR DISPENSING HEALTH PRODUCTS

OBJECT OF THE INVENTION

The present invention patent application seeks to register a cart for dispensing health products, comprising notable innovations and advantages.

More specifically, the invention proposes the development of a cart for dispensing health products, such as drugs, medicines and the like, designed to be used in health centres. The cost of manufacturing the same would be low, given that the invention is based on mechanical locking means found in each one of the drawers.

BACKGROUND OF THE INVENTION

In hospital centres, machines that issue or devices that store pharmaceutical products are usually found on each floor and may only be accessed by medical staff, subsequently facilitating the supply of these products in auxiliary carts, which are pulled by health staff in order to distribute said products to each one of the patients.

However, this pharmaceutical product distribution system is fairly expensive for hospital centres, not only as a result of the initial investment that must be made in order to acquire the same but also partly owing to the maintenance of these dispenser machines or storage devices.

Moreover, this system is limited in that it slows down the supply of drugs to patients, since at the start of each shift or at a certain time each day, all health staff responsible for distributing medicines via the carts must simultaneously collect the medicines from the dispenser machines, thereby delaying the time at which medicines or drugs are to be supplied, thus compromising the quality of the health service.

DESCRIPTION OF THE INVENTION

The present invention was developed with the aim of providing a dispenser cart, configured as a novelty within the field of application, which resolves the limitations set out above, furthermore contributing other additional advantages, which shall become clear as of the description below.

The aim of the present invention is therefore to provide a cart for dispensing health products, such as drugs, medicines, and the like, designed to be used in health centres, of the variety comprising a main chassis, provided with directional wheels underneath, wherein a plurality of drawers that protrude from at least a number of sides of said main chassis have been provided for, the same provided with locking means in order to remain in a fixed position in the main chassis, in addition to a control unit linked to the drawers in order to open and/or close the same, with a user interface.

The invention is specifically characterised by the fact that the plurality of drawers are supported on at least one removable support structure, each one of the drawers having a number of locking means associated to electrically operable fastening means found inside the main chassis, in communication with the control unit, the locking means of each one of the drawers including a number of position detection means.

Owing to these characteristics, it is possible to produce a cart for distributing medicines to sick patients residing in the rooms on one floor of a hospital centre, which is capable of improving efficiency as far as the system for supplying medicines in hospital centres is concerned, since it facilitates the supply of medicines in auxiliary carts. The locking system furthermore guarantees that the drawer selected by the control unit only opens as the cart is being used by health staff. Meanwhile, when the cart must be supplied with the medicines or drugs, the support structure, including the drawers, must simply be extracted and replaced by a support structure already provided with new medicines, without it being necessary to refill them individually.

This cart also means it is not necessary to make dispenser devices available on each floor, since only one main supply point is needed in order to refill the drawers with pharmaceutical products.

According to a particularly preferred embodiment, the locking means for each one of the drawers comprises a piece located on the rear wall of the drawer, which has an upper stretch with a triangular cross-section, with a sliding surface upon which the holding means may be slid, in addition to a lower stretch in the shape of a harpoon, wherein the corresponding holding means are coupled in a locked position, including the position detection means. The structure of this mechanical embodiment is therefore simple yet effective and may be produced at relatively low manufacturing costs.

The positioning means are preferably of the magnetic variety.

The magnetic positioning means also preferably comprise a ferromagnetic magnet, housed inside a housing located at the end of the lower stretch in the shape of a harpoon.

According to another aspect of the invention, the fastening means for each one of the drawers have a hook element that may be coupled to the lower stretch in the shape of a harpoon, it being possible for said hook element to be displaced by means of actuating a solenoid connected to the control unit.

The inside of the cart advantageously comprises a number of sliding extraction means upon which the support structure rests.

Said removable holding means preferably comprise a sliding tray, which may slide along the length of guide means arranged inside the main chassis.

In a preferred embodiment, the user interface comprises a display screen, although it may additionally or simply comprise a keyboard connected to the control unit and the display screen.

The removable support structure advantageously comprises a handle in its upper portion, which facilitates the transportation of the structure from a supply point to the cart and vice-versa.

According to another characteristic of the invention, the removable support structure is made from a rigid plastic material that may be moulded upon injection.

Other characteristics and advantages of the cart object of the present invention shall become evident in the description of a preferred, non-exclusive embodiment, set out by way of a non-limiting illustration below in the accompanying drawings, wherein:

DESCRIPTION OF A PREFERRED EMBODIMENT

In view of the figures mentioned above and in accordance with the numbering adopted therein, it is possible to observe a preferred exemplary embodiment of the invention, comprising the parts and elements indicated and described in detail below.

Figure 1:
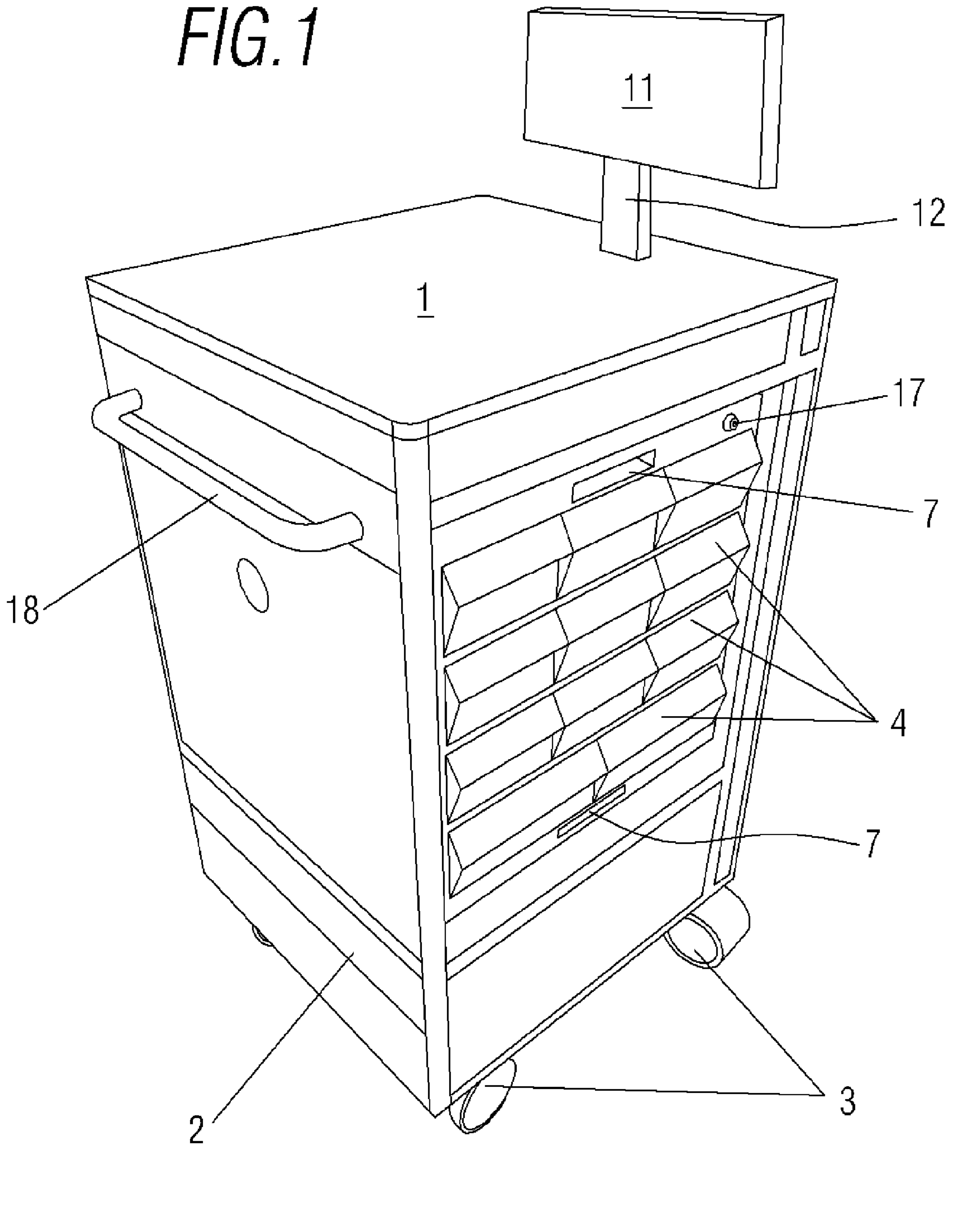
FIG. 1.—Is a perspective view of a medicine dispenser cart according to the present invention during use.
Figure 2:
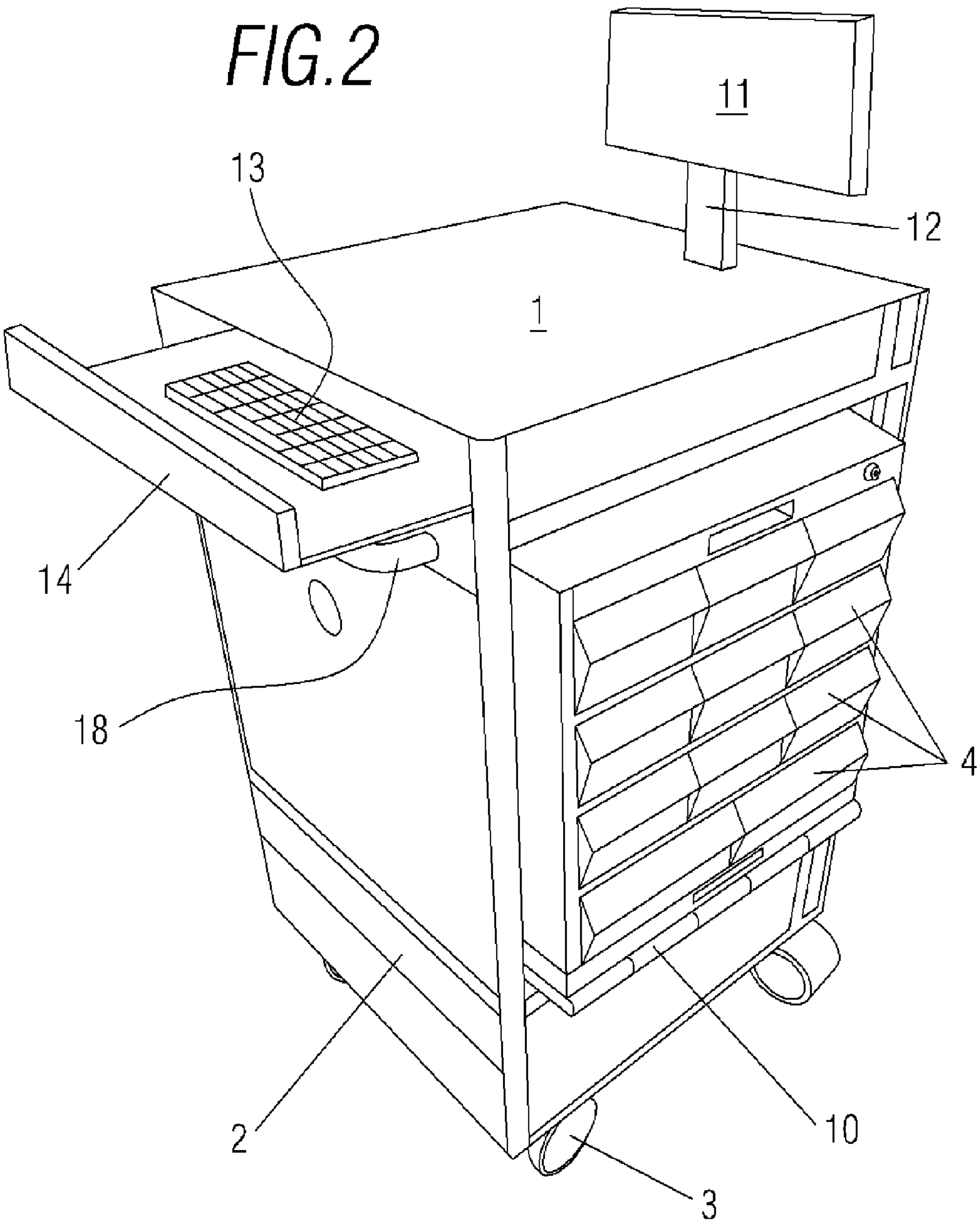
FIG. 2.—Is a perspective view of the medicine dispenser cart with the plurality of drawers being partially removed from the main chassis.
Figure 3:
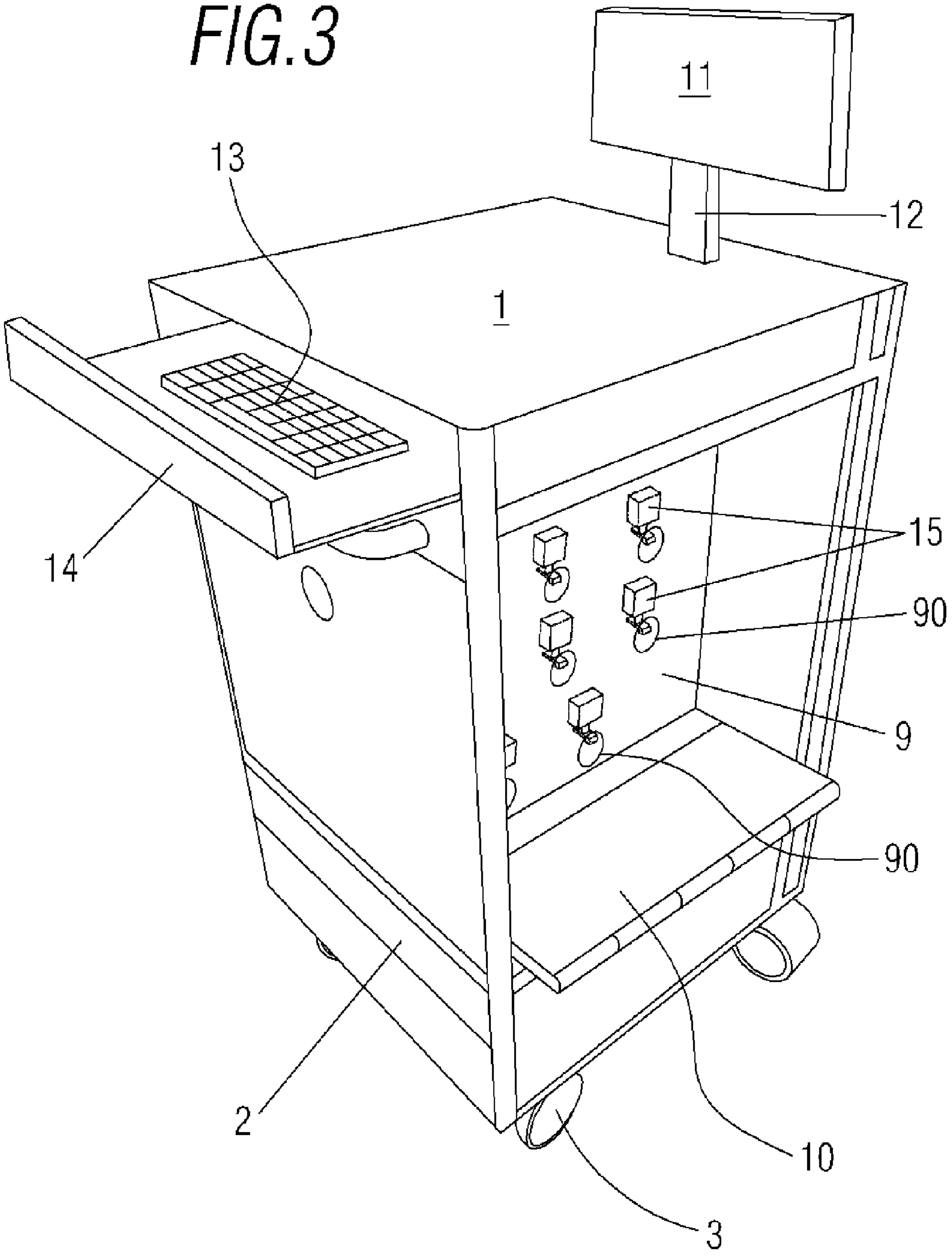
FIG. 3.—Is a perspective view of the cart without the support structure with the plurality of drawers.
Figure 4:
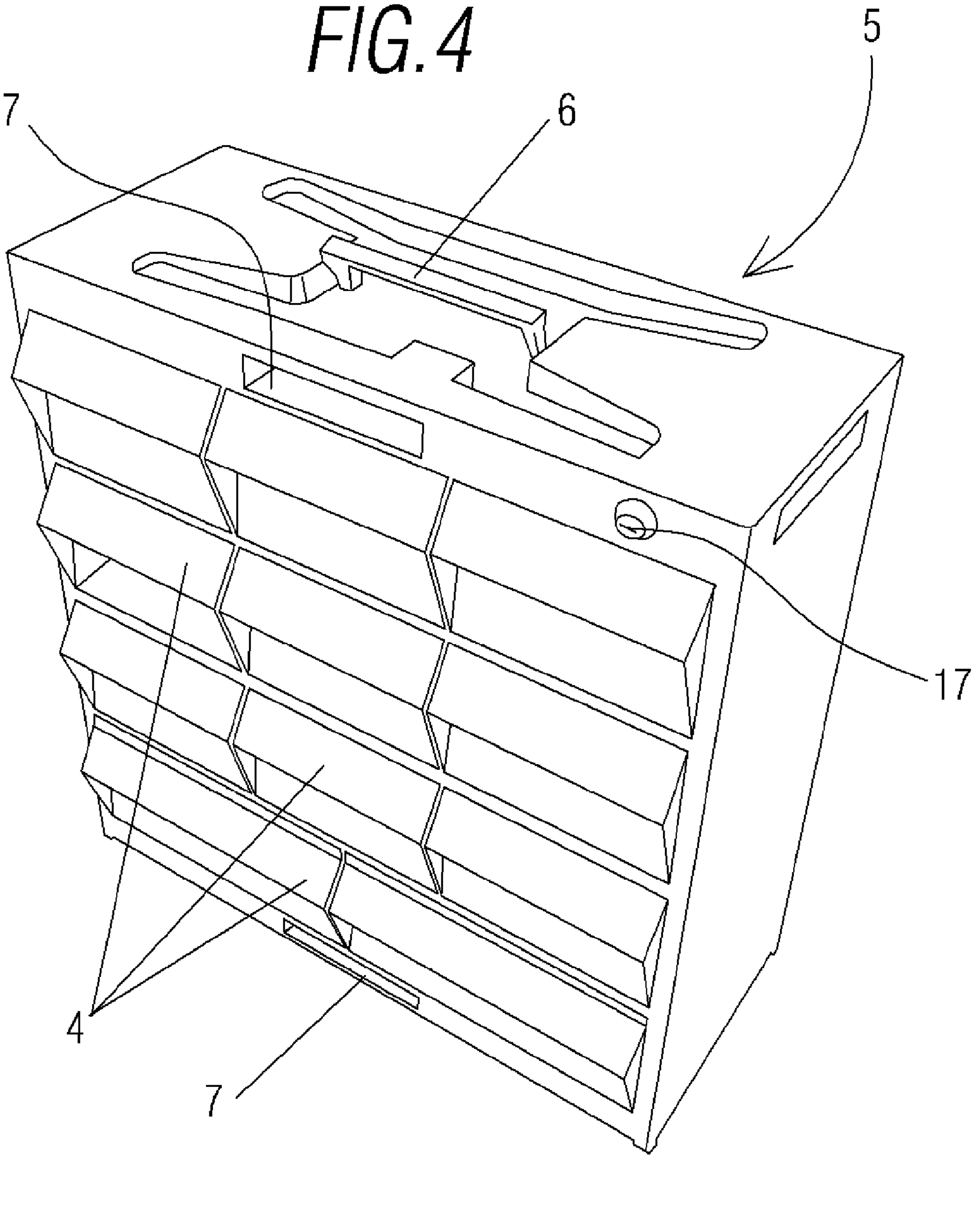
FIG. 4.—Is a perspective view of the support structure alongside the plurality of drawers.

Indeed, as can be observed in FIGS. 1 and 2, an embodiment of the cart (1) for dispensing health products such as drugs, medicines, and the like, designed for use in a health centre, essentially comprises a main chassis (2), formed by a lower base, an upper base and side walls, with a number of directional (3) wheels underneath that rotate freely and a handle (18) in order to displace the same, wherein a plurality of drawers (4) has been provided for, in which the drugs to be supplied to each patient, which come out of the two opposite sides of the main chassis (2) are suitably classified, both locking systems for the drawers having the same characteristics.

A number of locking means are provided for in the drawers (4), in order to keep the same in a fixed position in the main chassis (2). These shall be described in further detail later on. The cart (1) furthermore includes a control unit managed electrically and linked to the drawers (4) in order to open and/or close the same, with a user interface.

In the present description, in order to facilitate understanding and the operation of the embodiment set out, one of the support structures shall be explained, bearing in mind that both support structures are the same.

The plurality of drawers (4) is supported on a removable support structure (5) located in a housing inside the main chassis (2), which is preferably made of rigid plastic material that may be moulded upon injection, generally configured in the shape of a frame. In the upper portion of the support structure (5), a handle (6) (which may or may not be articulated) is arranged, which enables the user to grip and displace the support structure (5), such that it may be transported like a suitcase. In order to facilitate removal from the main chassis (2), a number of grooves (7) are provided in the upper and lower portions of the support structure (5).

Figure 5:
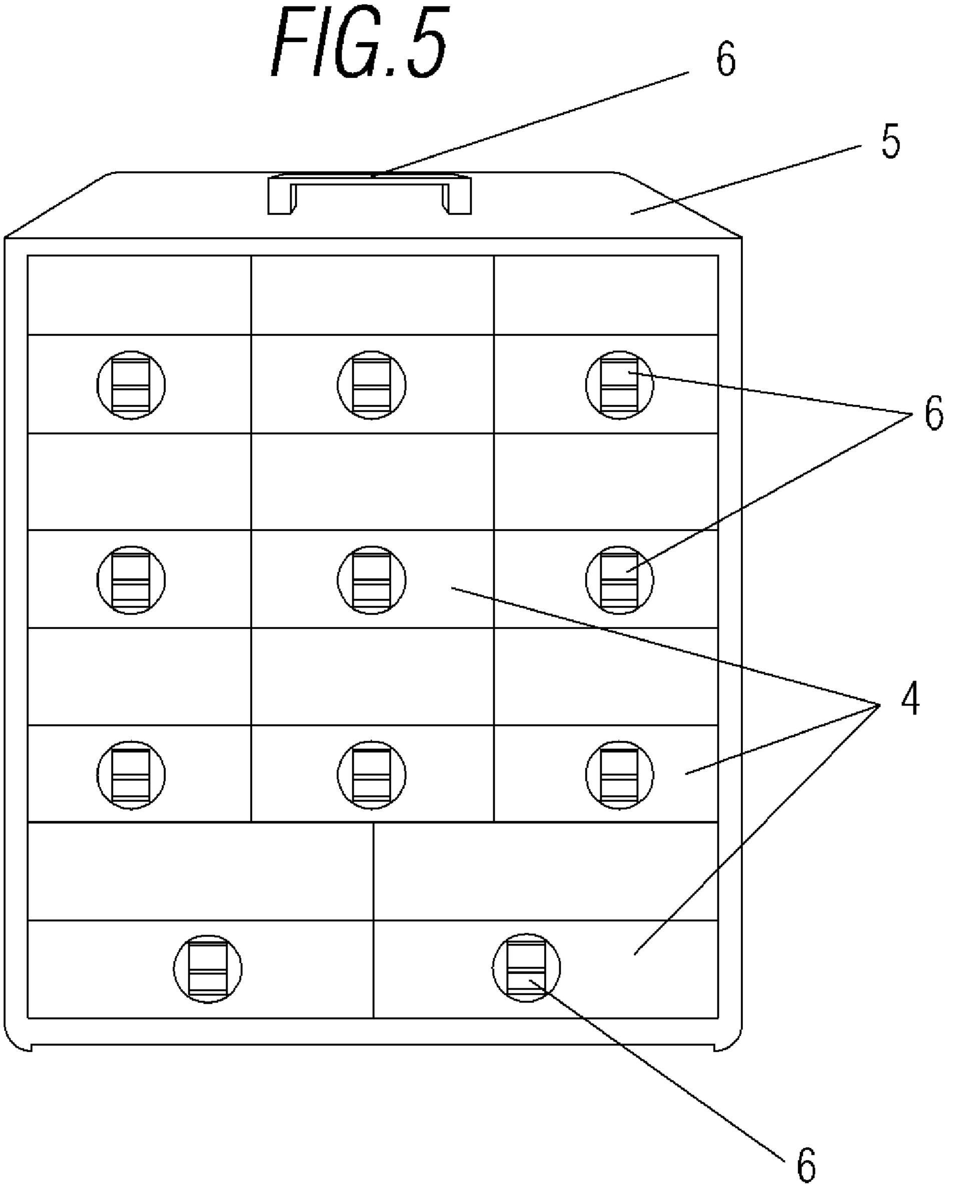
FIG. 5.—Is a rear perspective view of the support structure provided with the locking means.

As can be seen in FIG. 5, each one of the drawers (4) comprises a number of locking means on its rear wall, these locking means being associated to electrically operable holding means found inside the main chassis (2), in communication with the control unit, the locking means of each one of the drawers (4) including a number of position detection means.

Figure 6:
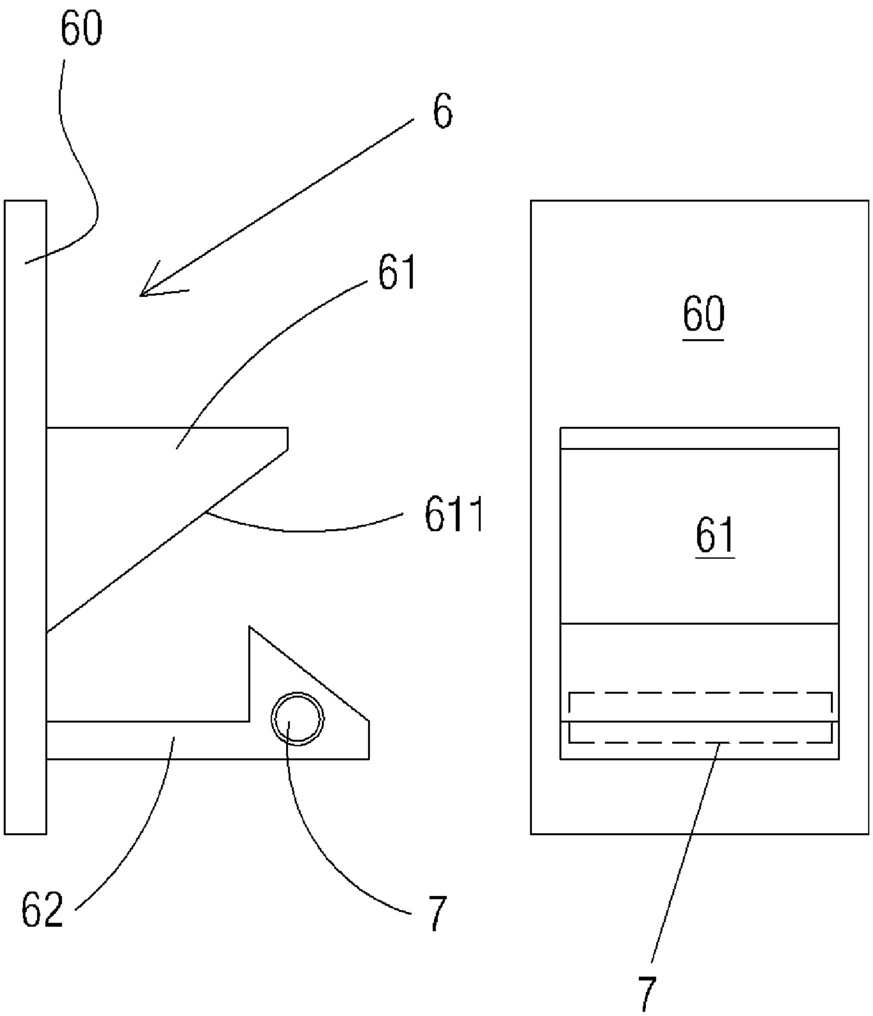
FIG. 6.—Is a detailed front and side elevation view of the piece that constitutes the locking means.

With particular reference to FIG. 6, the locking means comprise a piece (6) fixed to the rear wall (40) of the drawer (4), which has a flat stretch (60) from which an upper stretch (61) with a triangular cross-section protrudes, which has a sliding surface (611) upon which the holding means slide and a lower stretch (62), which is slightly harpoon-shaped, wherein the corresponding holding means are coupled in a locked position, including the position detection means, which are of the magnetic variety.

These magnetic positioning means comprise a ferromagnetic magnet (7), which is housed inside a housing located at the end of the lower stretch (62), in the shape of a harpoon, as can be seen in FIG. 6.

Figure 7:
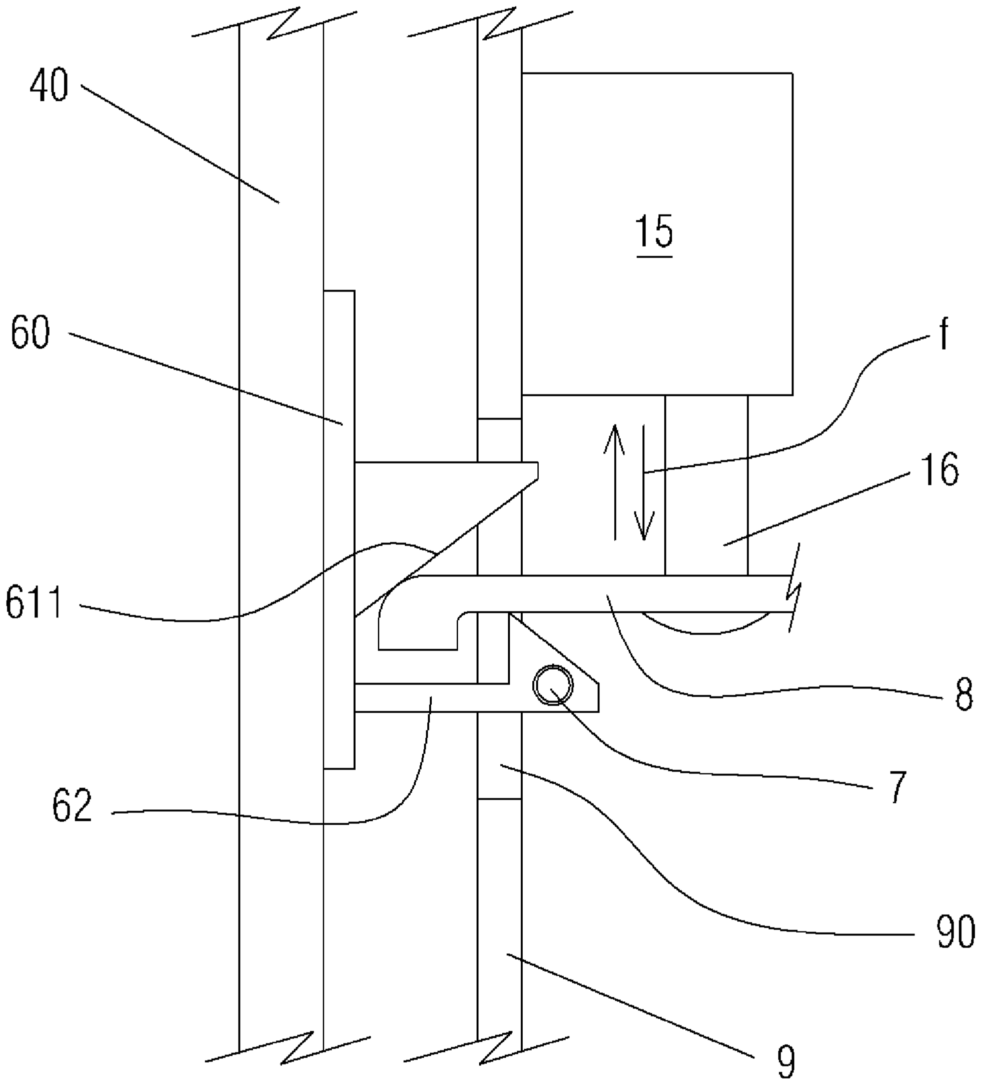
FIG. 7.—Is an elevation view of the hook element that forms part of the holding means coupled to the locking means shown in FIG. 6.

The fastening means for each one of the drawers have a hook element (8), which consists of a slightly elongated "L"-shaped piece, made from plastic material, which may be coupled to the lower stretch (62) in the shape of a harpoon, it being possible for said hook element (8) to be displaced (in the direction indicated by the arrows (f) in FIG. 7) by means of actuating a solenoid (or electric motor) (15) connected to the control unit, which acts on an actuator (16).

These holding means are located on a vertical wall (9) inside the main chassis (2), which includes a number of through-holes (90), through which the locking means set out above pass.

In order to facilitate the extraction of the support structure (5), the same has a sliding horizontal tray (10) located on the lower portion of the cart, which slides along a number of guide means arranged inside the main chassis (2) (not shown), which may consist of a pair of guide rails running parallel to and separate from one another, for example.

As far as the user interface is concerned, it comprises a display screen (11) supported by a column (12), which protrudes from the upper portion of the main chassis (2), the display screen (11) of which may be of the touch screen variety, such that a series of virtual buttons may be projected in order to operate the drawers (4), supported on the upper portion of the main chassis (2) as well as a keyboard (13) housed on an auxiliary retractable tray (14) positioned horizontally, in such a way that it may be hidden when not required.

When the cart (1) must be re-supplied with medicines, it is only necessary to unlock the latch by means of a lock (17) operated by a key, in such a way that the support structure (5) is extracted alongside the drawers with the help of the removable tray (10) and is ready to be pulled by means of the handle (6).

The details, shapes, dimensions and other complementary elements, as well as the materials used to produce the cart object of the invention, may be substituted for other, technically equivalent alternatives, as convenient, provided that they do not detract from the essence of the invention or the scope defined in the claims, included below.

The invention claimed is:

1. A cart for dispensing health products, designed to be used in a health centre, comprising: a main chassis provided with directional wheels underneath, wherein a plurality of drawers that protrude from at least a number of the sides of the main chassis are provided with a lock to keep them in a fixed position in the main chassis, a programmable control unit linked to the drawers in order to open and/or close the same, and with a user interface, wherein the plurality of drawers is supported by at least one support structure, wherein at least said support structure is removable, comprising a number of sliding extraction members upon which the support structure rests, each one of the drawers having a number of locks associated to electrically operable fasteners found inside the main chassis, and in communication with the control unit, the lock of each one of the drawers including a number of position detection indicators, wherein said locks for each one of the drawers are arranged on the rear wall of the drawer wherein the lock for each one of the drawers comprises a piece located on the rear wall of the drawer, having an upper stretch with a triangular cross-section, which has a sliding surface upon which a holder may slide and a lower surface, which is slightly harpoon-shaped, wherein the corresponding holder is coupled in a locked position, including the position detection indicator, and wherein said holder is located on a vertical wall inside the main chassis, which includes a number of through-holes, through which the lock passes.

2. The cart for dispensing health products according to claim 1, wherein the position detection indicator is of a magnetic variety.

3. The cart for dispensing health products according to claim 1, wherein the magnetic position detection indicator comprises a ferromagnetic magnet, housed inside a housing located at the end of the lower stretch in the shape of a harpoon.

4. The cart for dispending health products according to claim 1, wherein the fastener for each one of the drawers has a hook element that may be coupled to the lower stretch in the shape of a harpoon, said hook element being displaced by actuating a solenoid connected to the control unit.

5. The cart for dispensing health products according to claim 4, wherein the removable holder comprises a sliding tray, which may be slid along the length of a guide arranged inside the main chassis.

6. The cart for dispensing health products according to claim 1, wherein the support structure comprises a number of auxiliary locks, used to fix the support structure to the main chassis.

7. The cart for dispensing health products according to claim 6, wherein the auxiliary lock comprises a latch that may be operated by use of a key.

8. The cart for dispensing health products according to claim 1, wherein the user interface comprises a display screen.

9. The cart for dispending health products according to claim 1, wherein the user interface comprises a keyboard.

10. The cart for dispensing health products according to claim 1, wherein the removable support structure comprises a handle in its upper portion.

11. The cart for dispensing health products according to claim 1, wherein the removable support structure is made from rigid plastic material that is molded upon injection.

* * * * *